L. H. CHURCH.
OUTLET BOX.
APPLICATION FILED MAR. 31, 1906. RENEWED MAR. 15, 1909.
934,995.
Patented Sept. 28, 1909.
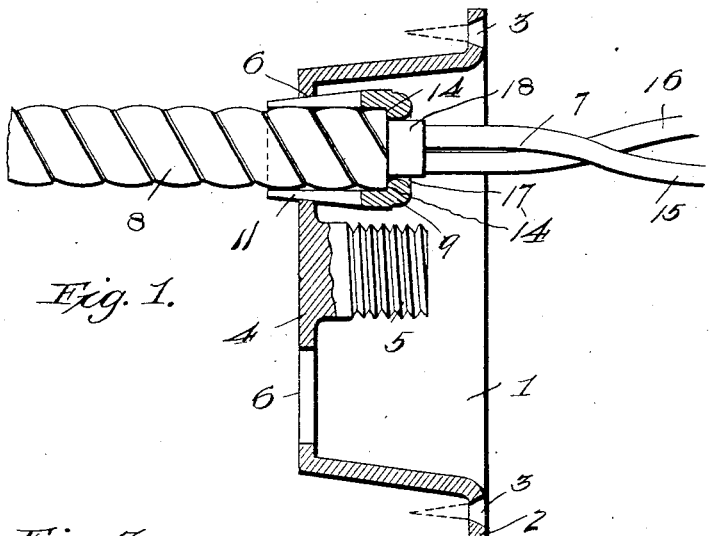
Fig. 1.
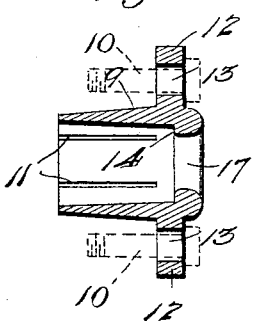
Fig. 4.
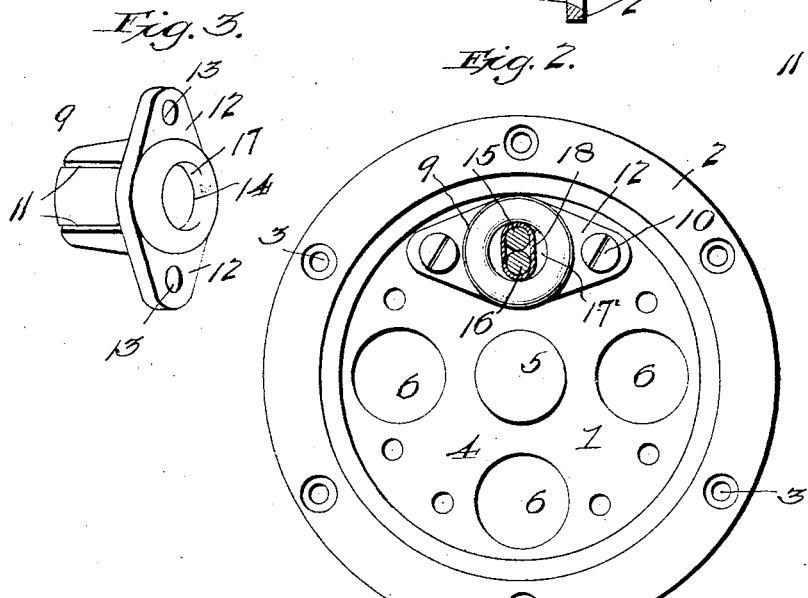
Fig. 3.
Fig. 2.
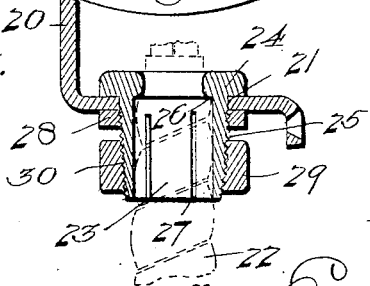
Fig. 5.
Inventor
Lewis H. Church
Witnesses
By Edw. S. Duvall Jr.
Attorney

UNITED STATES PATENT OFFICE.

LEWIS H. CHURCH, OF STAMFORD, CONNECTICUT.

OUTLET-BOX.

934,995.  Specification of Letters Patent.  Patented Sept. 28, 1909.

Application filed March 31, 1906, Serial No. 309,182. Renewed March 15, 1909. Serial No. 483,583.

*To all whom it may concern:*

Be it known that I, LEWIS H. CHURCH, a citizen of the United States, residing at Stamford, in the county of Fairfield and State of Connecticut, have invented new and useful Improvements in Outlet-Boxes, of which the following is a specification.

My invention relates to improvements in outlet or junction boxes and the objects of the same are; first, to provide a secure fastening in the box for the cable and a perfect bond between the cable sheath and the outlet box; second, to provide a bushing which will protect the wire from wear at the point where the sheath ends; third, to provide a bushing which is quickly and easily secured in place and removed; fourth, to provide a bushing which will secure the cable in the outlet box without injuring the sheath and the insulation of the conductor; fifth, to provide an outlet box which is flush with the wall when in position, and many other objects and advantages which will be apparent from the following specifications. I attain these objects by the mechanism illustrated in the accompanying drawings, in which—

Figure 1 is a transverse sectional view. Fig. 2 is a front elevation. Fig. 3 is a detail view in perspective of the bushing and, Fig. 4 is a detail sectional view of the same. Fig. 5 is a sectional view of a modified form of bushing for use where the cables enter the outlet box on the side.

Similar numerals of reference designate similar parts throughout the several views.

1 is the outlet box which is annular in shape and of suitable depth for the purpose and the same is provided with the annular flange 2, which is perforated at suitable intervals for the reception of the fastening screws, 3. The back or bottom of the box, 4, carries an integral stud, 5, which is exteriorly threaded for the connection of the electric fixture. The back, 4, may be provided with one or more cable openings, 6.

In the form of box shown herein, openings are made for the reception of four cables, but I desire to have it distinctly understood that the box may be altered in shape or form for a greater or smaller number of cables or for the entry of the cables either in the manner illustrated or at an angle to the axis of the box. The cable, 7, is covered by the protecting sheath, 8, which is here illustrated as spirally wound to preserve the flexibility of the cable. These cables so protected by the sheathing, enter the bushing, 9, which is seated in the cable opening, 6, and secured in place by the screws, 10. This bushing is provided with a number of longitudinal slits, 11, extending from one end to the perforated ears, 12, at the other end thereof. The perforations, 13, in these ears receive the screws, 10, which secure the bushing to the outlet box. The slitted portion of the bushing is exteriorly tapered from the ears, 12, to the end, while the interior of the bushing is tapered in the opposite direction to a point a suitable distance from this end of the bushing where the interior bore terminates in an annular shoulder, 14. This shoulder abuts against the end of the sheath, 8, and the conductors, 15 and 16, of the cable, 7, pass through the reduced opening, 17, at this end of the bushing.

To protect the insulation, 18, of the cable against wear, the opening 17 is formed in the shape of a rounded boss which gives a bearing surface free from cutting edges. This boss will be clearly seen in Fig. 4 of the drawing. By the construction of bushing just described, it will be seen that the tapered portion will be tightly compressed about the sheath of the cable where the opening, 6, is smaller than the greatest diameter of the bushing as is the construction herein shown. By tightening the screws, 10, the bushing is drawn into the opening, 6, as far as the taper will permit and at the same time the bushing is compressed around the sheath and secures a firm and evenly distributed annular grip upon it.

It will be seen by referring to Fig. 1 of the drawings that the bushing, by reason of the exterior and interior tapers, is afforded an increased bearing surface upon the sheath and the benefits from this are two-fold. first, it gives a very secure fastening in the outlet box for the cable and secondly, it furnishes a perfect bond between the sheath and the metallic outlet box which is desirable in electrical installation as is well known to those versed in the art. It will also be observed that the fastening device thus described and shown cannot injure the sheath for the bearing surface is upon all points of the sheath circumferentially and the compression is equally distributed thereabout. Where the securing pressure or fastening means are brought to bear against the sheath in any other manner as in the case of a binding screw or similar clamping device the result is that the sheath is flattened against the conductors of the cable to the injury thereof.

My invention is designed to overcome especially any damage to the conductors by flattening of the sheath.

This outlet box is intended to be seated in the wall or ceiling so that it will be flush therewith and a beneficial result from this feature of the invention is that a smaller canopy may be employed. This form of outlet box is particularly adapted for use in a finished building where it is desirable to avoid breaking the plaster as is the case where it is necessary to secure the box at the back thereof. The opening that is required is just sufficient to seat the outlet box therein with its flange, 2, resting against a fastening surface.

In Fig. 5 I have illustrated a modified form of bushing for use where the cable enters the outlet box on the side thereof. The box, 20, is provided with the opening, 21, upon the side instead of the back. In order to secure the cable, 22, therein a bushing, 23, is provided which said bushing is designed to be inserted in the opening from the inside of the box as in the case of the preferred form of my invention. This bushing is similar in every respect to the preferred form with the following exceptions: namely, it is provided with an annular shoulder or flange, 24, instead of the ears, 12, and is provided with threads upon the tapered exterior surface, which threads, 25, extend from the end of the bushing nearly to the shoulder, 24. The bushing is provided with the interior shoulder, 26, and with the longitudinal slits, 27, for the same purposes as those in the preferred form of the invention. The bushing thus described is secured to the outlet box by a lock nut, 28, threaded upon the outside of the same. This lock nut, when tightened against the box draws the annular shoulder, 24, up against the interior thereof. Upon the bushing is also threaded a sleeve, 29, having a threaded interior bore, 30, tapered to correspond to the exterior of the bushing. By tightening up this sleeve it will be understood that the compression will cause the sheath around the cable to be tightly gripped in the manner ascribed to the preferred form of the invention and all of the beneficial objects therein attained are preserved in this modification.

It is to be understood that the construction herein described is adapted for use in connection with outlet and junction boxes for either cables or conduits.

Having thus described my invention what I claim as new and desire to secure by Letters Patent, is:—

1. An outlet box provided with an annular flange, means for securing the box to the building at said annular flange, longitudinally tapered and split bushings, said box having its walls provided with openings adapted to receive said bushings, said bushings having securing ears, and fastenings passed through said securing ears.

2. The combination with an outlet box, of a bushing adapted to be inserted in a cable opening and receive the cable, the said bushing having a tapered bore and an interior, annular shoulder at one end thereof, longitudinal slits in said bushing extending from the opposite end thereof to a point short of the said annular shoulder, an exteriorly tapered surface adapted to compress the bushing circumferentially about the cable or conduit when the bushing is seated in the cable opening and means for securing the bushing to the outlet box.

3. A bushing for outlet boxes comprising a tapered body portion having longitudinal slits therein and a bore oppositely tapered and provided with a shoulder near one end and a rounded boss at the opening of the bushing at this end, and diametrically-opposed and perforated ears for the reception of means for securing said bushing within the cable-entering openings of an outlet box.

4. An outlet box having cable openings in the walls thereof, bushings adapted to receive the cables having longitudinally split and tapered portions received in the cable openings, the bushings having each an internal shoulder to be engaged by the end of the cable sheath, and means for seating the bushings in the cable openings to cause the bushings to clamp the cable sheath.

5. A bushing for outlet boxes comprising a tapered, split body-portion having an oppositely tapered bore, and means for the retention of said body-portion in the cable-receiving opening of said outlet-box.

6. A bushing for outlet boxes comprising a tapered, split body-portion having an oppositely tapered bore and a shoulder therein near one end, and means for the retention of said body-portion in the cable-receiving opening of said outlet-box.

7. A bushing for outlet-boxes comprising a tapered, split body-portion having an oppositely tapered bore and a shoulder therein near one end and a rounded boss at said end and means for the retention of said body-portion in the cable-receiving opening of said outlet-box.

In testimony whereof I affix my signature, in presence of two subscribing witnesses.

LEWIS H. CHURCH.

Witnesses:
   CHAS. E. RIORDON,
   EDW. S. DUVALL, Jr.